US012621899B2

(12) United States Patent
Gummadi et al.

(10) Patent No.: US 12,621,899 B2
(45) Date of Patent: May 5, 2026

(54) METHODS AND SYSTEMS FOR TRANSITIONING A USER EQUIPMENT TO AN INACTIVE STATE

(71) Applicant: QUALCOMM Incorporated, San Diego, CA (US)

(72) Inventors: Bapineedu Chowdary Gummadi, Hyderabad (IN); Santosh Kumar Kancherla, Hyderabad (IN); Kishore Danta, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/647,692

(22) Filed: Apr. 26, 2024

(65) Prior Publication Data

US 2024/0306243 A1 Sep. 12, 2024

Related U.S. Application Data

(62) Division of application No. 17/156,473, filed on Jan. 22, 2021, now abandoned.

(51) Int. Cl.
| | |
|---|---|
| *H04W 76/27* | (2018.01) |
| *H04W 8/18* | (2009.01) |
| *H04W 68/02* | (2009.01) |
| *H04W 72/21* | (2023.01) |
| *H04W 72/23* | (2023.01) |
| *H04W 72/51* | (2023.01) |
| *H04W 72/542* | (2023.01) |

(52) U.S. Cl.
CPC ........... *H04W 76/27* (2018.02); *H04W 8/183* (2013.01); *H04W 68/02* (2013.01); *H04W*

*72/21* (2023.01); *H04W 72/23* (2023.01); *H04W 72/51* (2023.01); *H04W 72/542* (2023.01)

(58) Field of Classification Search
CPC ..... H04W 76/27; H04W 8/183; H04W 68/02; H04W 72/21; H04W 72/23; H04W 72/51; H04W 72/542; H04W 76/19; H04W 60/005
USPC ....................................... 370/329
See application file for complete search history.

(56) References Cited

U.S. PATENT DOCUMENTS

| | | |
|---|---|---|
| 2004/0235536 A1 | 11/2004 | Kim et al. |
| 2018/0176834 A1* | 6/2018 | Wei .................. H04W 36/0066 |
| 2019/0349816 A1* | 11/2019 | Kiss ..................... H04W 36/06 |
| 2019/0387490 A1 | 12/2019 | Li et al. |

(Continued)

FOREIGN PATENT DOCUMENTS

| | | |
|---|---|---|
| CN | 114982288 A | 8/2022 |
| WO | 2021002859 A1 | 1/2021 |
| WO | 2021233527 A1 | 11/2021 |

*Primary Examiner* — Rownak Islam
(74) *Attorney, Agent, or Firm* — Harrity & Harrity, LLP

(57) ABSTRACT

Wireless communications systems and methods related to transition of a user equipment (UE) to an inactive state are provided. In some aspects, a multi-subscriber identity module (MSIM) UE may request a network to transition one subscription or SIM to an inactive state when another subscription or SIM has a higher priority. In some aspects, a UE may request for the UE to be transitioned to an inactive state based on the signal quality of network signals at the location of the UE. In some aspects, a UE may request a network to transition the network to an inactive state when downlink data transmission from the network to the UE has stalled.

40 Claims, 11 Drawing Sheets

300 ⟶

(56)     References Cited

U.S. PATENT DOCUMENTS

| | | | |
|---|---|---|---|
| 2020/0280954 A1 | 9/2020 | Fujishiro et al. | |
| 2020/0314947 A1 | 10/2020 | Latheef et al. | |
| 2020/0351744 A1 | 11/2020 | Latheef et al. | |
| 2020/0374973 A1 | 11/2020 | Sun et al. | |
| 2021/0014926 A1 | 1/2021 | Xu et al. | |
| 2021/0014934 A1 | 1/2021 | Lovlekar et al. | |
| 2021/0044933 A1* | 2/2021 | Ding ..................... | H04W 4/029 |
| 2021/0195686 A1 | 6/2021 | Kaur | |
| 2022/0248494 A1 | 8/2022 | Gummadi et al. | |
| 2022/0312531 A1 | 9/2022 | Lovlekar et al. | |
| 2023/0047213 A1 | 2/2023 | Chen et al. | |
| 2023/0189382 A1* | 6/2023 | Haustein .............. | H04W 76/20 |
| | | | 370/329 |
| 2023/0309181 A1* | 9/2023 | Wang ................... | H04W 52/02 |
| 2023/0388919 A1 | 11/2023 | Wu et al. | |

* cited by examiner

300

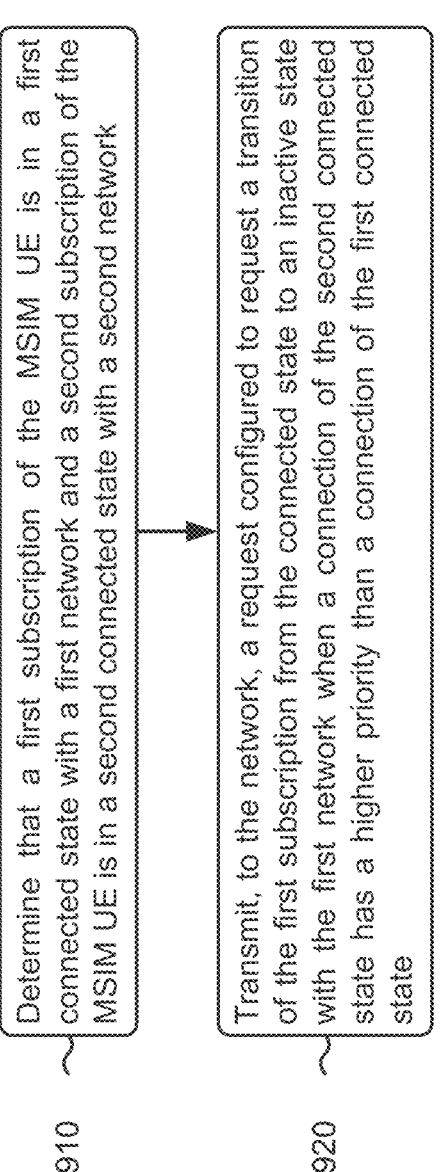

910

Determine that a first subscription of the MSIM UE is in a first connected state with a first network and a second subscription of the MSIM UE is in a second connected state with a second network

920

Transmit, to the network, a request configured to request a transition of the first subscription from the connected state to an inactive state with the first network when a connection of the second connected state has a higher priority than a connection of the first connected state

1110 — Determine downlink data transmission to the UE from a network to which the UE is in a connected state has stalled 1120 — Transmit a request to the network requesting a transition of the UE from the connected state to an inactive state with the network

METHODS AND SYSTEMS FOR TRANSITIONING A USER EQUIPMENT TO AN INACTIVE STATE

CROSS-REFERENCE TO RELATED APPLICATIONS

The present application is a divisional application of U.S. patent application Ser. No. 17/156,473, filed Jan. 22, 2021, the entirety of which is incorporated by reference herein.

FIELD OF THE DISCLOSURE

This application relates to wireless communication systems, and more particularly to the transitioning of a user equipment (UE) between a connected state and an inactive state based on UE subscription priority, network signal quality and network data stall.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

BRIEF SUMMARY OF SOME EXAMPLES

In some aspects, a method of wireless communication performed by a multi-subscriber identity module (MSIM) user equipment (UE) includes determining a first subscription of the MSIM UE is in a first connected state with a first network and a second subscription of the MSIM UE is in a second connected state with a second network. In some aspects, the UE may further transmit, to the network, a request configured to request a transition of the first subscription from the first connected state to an inactive state with the first network when a connection of the second connected state has a higher priority than a connection of the first connected state.

In some aspects, a method of wireless communication performed by a UE includes performing a first estimation of a quality of signal coverage of a network at a location of the UE that is in a connected state with the network. Further, the UE may determine whether to transmit a request to the network based on the first estimation, the request configured to request a transition of the UE from the connected state to an inactive state with the network.

In some aspects, a method of wireless communication performed by a UE includes determining downlink data transmission to the UE from a network to which the UE is in a connected state has stalled. In some aspects, the UE may transmit, to the network, a request configured to request a transition of the UE from the connected state to an inactive state with the network.

In some aspects, a user equipment (UE) comprises a processor and a transceiver. In some instances, the processor may be configured to determine a first subscription of the MSIM UE is in a first connected state with a first network and a second subscription of the MSIM UE is in a second connected state with a second network. In some instances, the transceiver may be configured to transmit, to the network, a request configured to request a transition of the first subscription from the first connected state to an inactive state with the first network when a connection of the second connected state has a higher priority than a connection of the first connected state.

In some aspects, a user equipment (UE) comprises a processor configured to perform a first estimation of a quality of signal coverage of a network at a location of the UE that is in a connected state with the network. The processor may further be configured to determine whether to transmit a request to the network based on the first estimation, the request configured to request a transition of the UE from the connected state to an inactive state with the network.

In some aspects, a user equipment (UE) comprises a processor and a transceiver. In some instances, the processor may be configured to determine downlink data transmission to the UE from a network to which the UE is in a connected state has stalled. In some instances, the transceiver may be configured to transmit, to the network, a request configured to request a transition of the UE from the connected state to an inactive state with the network.

In some aspects, a non-transitory computer-readable medium may have program code recorded thereon for wireless communication by a user equipment (UE). In some instances, the program code may comprise code for causing the UE to determine a first subscription of the MSIM UE is in a first connected state with a first network and a second subscription of the MSIM UE is in a second connected state with a second network. Further, the program code may comprise code for causing the UE to transmit, to the network, a request configured to request a transition of the first subscription from the first connected state to an inactive state with the first network when a connection of the second connected state has a higher priority than a connection of the first connected state.

In some aspects, a non-transitory computer-readable medium may have program code recorded thereon for wireless communication by a user equipment (UE). In some instances, the program code may comprise code for causing the UE to perform a first estimation of a quality of signal coverage of a network at a location of the UE that is in a connected state with the network. The program code may further comprise code for causing the UE to determine whether to transmit a request to the network based on the first estimation, the request configured to request a transition of the UE from the connected state to an inactive state with the network.

In some aspects, a non-transitory computer-readable medium may have program code recorded thereon for wireless communication by a user equipment (UE). In some instances, the program code may comprise code for causing the UE to determine downlink data transmission to the UE from a network to which the UE is in a connected state has stalled. Further, the program code may comprise code for causing the UE to transmit, to the network, a request configured to request a transition of the UE from the connected state to an inactive state with the network.

In some aspects, a user equipment (UE) comprises means for determining a first subscription of the MSIM UE is in a first connected state with a first network and a second subscription of the MSIM UE is in a second connected state with a second network. In some aspects, the UE further comprises means for transmitting, to the network, a request configured to request a transition of the first subscription from the first connected state to an inactive state with the first network when a connection of the second connected state has a higher priority than a connection of the first connected state.

In some aspects, a user equipment (UE) comprises means for performing a first estimation of a quality of signal coverage of a network at a location of the UE that is in a connected state with the network. In some aspects, the UE further comprises means for determining whether to transmit a request to the network based on the first estimation, the request configured to request a transition of the UE from the connected state to an inactive state with the network.

In some aspects, a user equipment (UE) comprises means for determining downlink data transmission to the UE from a network to which the UE is in a connected state has stalled. Further, the UE comprises means for transmitting, to the network, a request configured to request a transition of the UE from the connected state to an inactive state with the network.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 9 is a flow diagram illustrating a method according to some aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
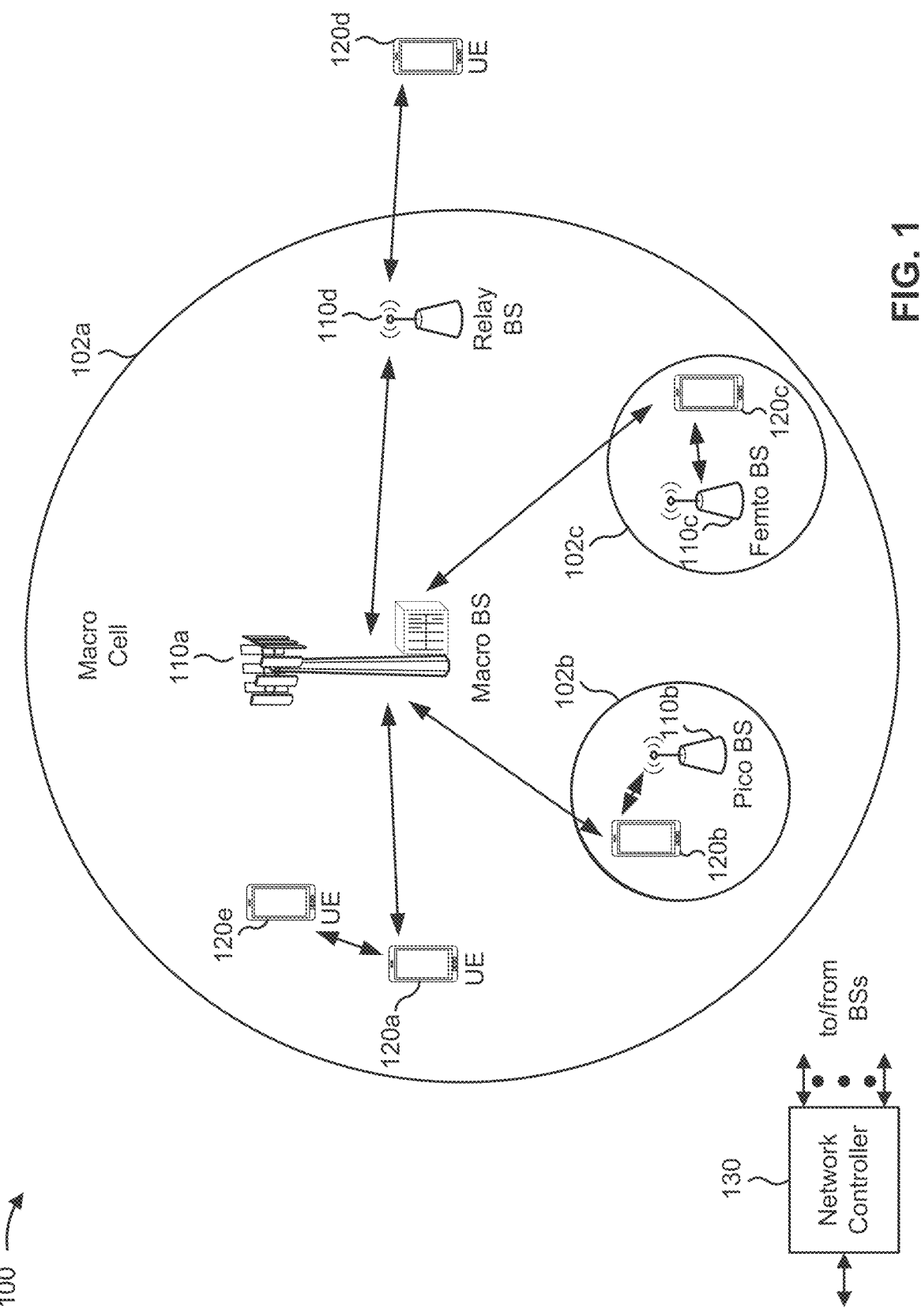
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

A UE 120 may be a multi-subscriber identity module (Multi-SIM or MSIM) UE that includes multiple SIMs (two or more SIMs), each SIM associated with a subscription. A subscription may include a subscription with a network operator (for example, a mobile network operator (MNO)) that allows the UE 120 to access a wireless network (for example, a radio access network (RAN)) associated with the network operator.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120c) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHZ, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHZ, FR1 is often referred to as a "sub-6 GHz" band. Similarly, FR2 is often referred to as a "millimeter wave" band despite being different from the extremely high frequency (EHF) band (30 GHZ-300 GHZ) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHZ, frequencies within FR1, and/or mid-band frequencies (e.g., greater than 7.125 GHZ). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHZ). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
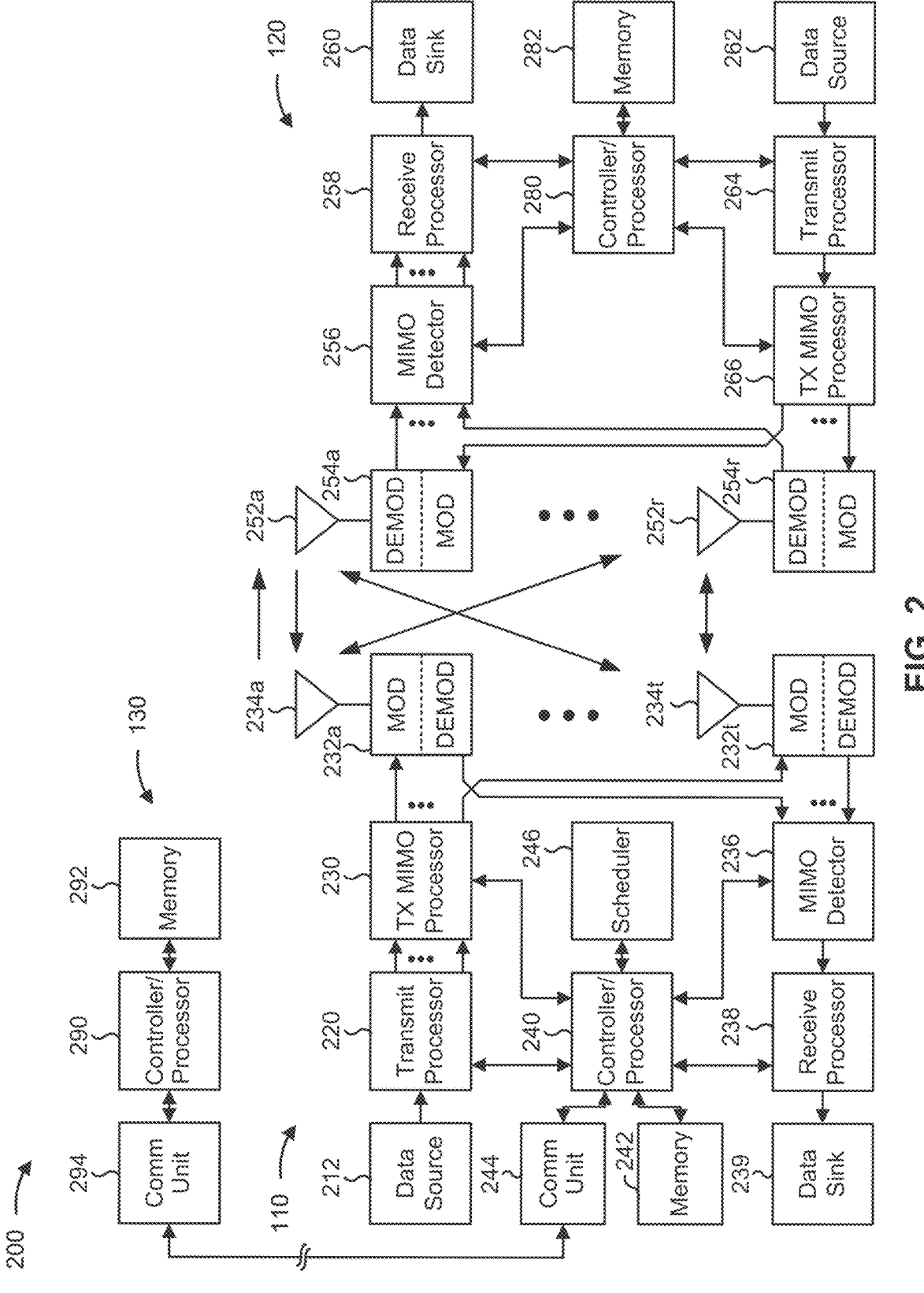
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 4-6 and 9-11.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 4-6 and 9-11.

Controller/processor 240 of base station 110, controller/processor 280 of UE 120, and/or any other component(s) of FIG. 2 may perform one or more techniques associated with the transitioning of a UE 120 between a connected state and an inactive state based on UE subscription priority, network signal quality and network data stall, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, process 600 of FIG. 6, process 900 of FIG. 9, process 1000 of FIG. 10, process 1100 of FIG. 11, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 400 of FIG. 4, process 500 of FIG. 5, process 600 of FIG. 6, process 900 of FIG. 9, process 1000 of FIG. 10, process 1100 of FIG. 11, and/or other processes as described herein. In some aspects, executing instructions may include running the instructions, converting the instructions, compiling the instructions, interpreting the instructions, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
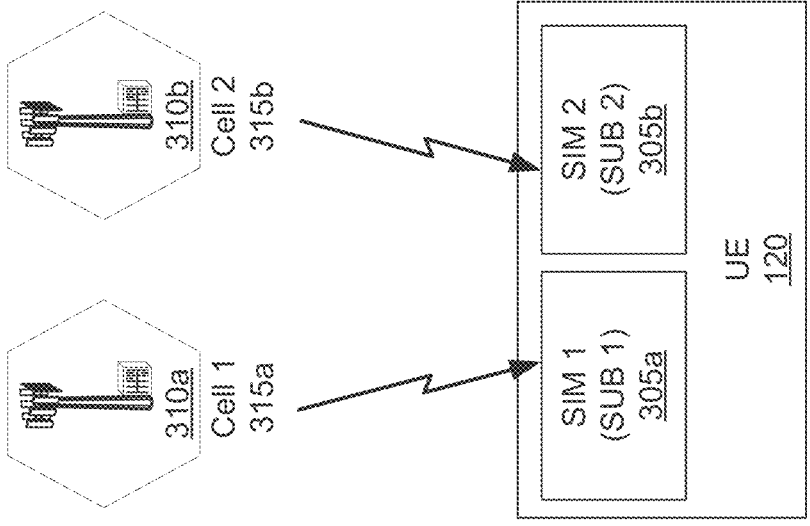
FIG. 3 is a diagram illustrating an example of a multi-subscriber identity module (MSIM) UE, in accordance with various aspects of the present disclosure.

FIG. 3 is a diagram illustrating an example 300 of a multi-subscriber identity module (Multi-SIM or MSIM) UE, in accordance with various aspects of the present disclosure. As shown in FIG. 3, a UE 120 may be a multi-SIM UE that includes multiple SIMs (two or more SIMs), shown as a first SIM 305a and a second SIM 305b. The first SIM 305a may be associated with a first subscription (shown as SUB 1), and the second SIM 305b may be associated with a second subscription (shown as SUB 2). A subscription (SUB) may include a subscription with a network operator (for example, a mobile network operator (MNO)) that enables the UE 120 to access a wireless network (for example, a radio access network (RAN)) associated with the network operator.

A SIM 305 may be a removable SIM (for example, a SIM card) or an embedded SIM. A SIM 305 may include an integrated circuit that securely stores an international mobile subscriber identity (IMSI) and a security key, which are used to identify and authenticate a corresponding subscription associated with the SIM 305. In some cases, a SIM 305 may store a list of services that the UE 120 has permission to access using a subscription associated with the SIM 305, such as a data service or a voice service, among other examples.

As further shown in FIG. 3, the UE 120 may communicate (for example, in a connected mode, an idle mode, or an inactive mode) with a first base station 310a via a first cell 315a (shown as Cell 1) using the first SIM 305a. In this case, a first subscription (SUB 1) of the UE 120 may be used to access the first cell 315a (for example, using a first IMSI for UE identification, using a first security key for UE authentication, using a first list of services that the UE 120 is permitted to access using the first subscription, or by counting data or voice usage on the first cell against the first subscription, among other examples). Similarly, the UE 120 may communicate (for example, in a connected mode, an idle mode, or an inactive mode) with a second base station 310b via a second cell 315b (shown as Cell 2) using the second SIM 305b. In this case, a second subscription (SUB 2) of the UE 120 may be used to access the second cell 315b (for example, using a second IMSI for UE identification, using a second security key for UE authentication, using a second list of services that the UE 120 is permitted to access using the second subscription, or by counting data or voice usage on the second cell against the second subscription, among other examples). In some aspects, the terms "mode" and "state" may be used interchangeably, for example, when referring to "connected mode" and "connected state", "idle mode" and "idle state", or "inactive mode" and "inactive state".

The first base station 310*a* and/or the second base station 310*b* may include one or more of the base stations 110 described above in connection with FIG. 1. Although the first cell 315*a* and the second cell 315*b* are shown as being provided by different base stations, in some aspects, the first cell 315*a* and the second cell 315*b* may be provided by the same base station. Thus, in some aspects, the first base station 310*a* and the second base station 310*b* may be integrated into a single base station.

In some cases, the UE 120 may be a single receiver (SR) (sometimes also referred to as single radio) multi-SIM UE, such as an SR multi-SIM multiple standby (SR-MSMS) UE, a single receiver dual SIM dual standby (SR-DSDS) UE, or a dual receiver dual standby (DRDS) UE, among other examples. A multi-SIM (MSIM) UE may be capable of switching between two separate mobile network services, may include hardware for maintaining multiple connections (for example, one connection per SIM) in a standby state, or may include hardware (for example, multiple transceivers) for maintaining multiple network connections at the same time, among other examples. However, an SR-DSDS UE or an SR-MSMS UE may only be capable of receiving data on one connection at a time because radio frequency resources are shared between the multiple subscriptions. For example, an SR-DSDS UE or an SR-MSMS UE may be associated with multiple subscriptions but may include only a single transceiver shared by the multiple subscriptions, a single transmit chain shared by the multiple subscriptions, or a single receive chain shared by the multiple subscriptions, among other examples. A DRDS UE may receive simultaneously on both subscriptions of the DRDS UE, but may not transmit. As such, such a DRDS UE may be able to receive, but not transmit, on a second subscription or SIM when the first subscription or SIM has a higher priority connection (e.g., a call). That is, the second subscription may still be in service, i.e., may still be in a connected state with a radio network (e.g., although as a receiver and not transmitter) when the first one has a higher priority connected state.

As indicated above, FIG. 3 is provided as an example. Other examples may differ from what is described with regard to FIG. 3.

As noted above, in some aspects, a MSIM UE can have multiple subscriptions where each subscription may communicate to a radio network (e.g., LTE network, NR network, etc.) via a base station in a connected mode or state, in an idle mode or state, or in an inactive mode or state. In some aspects, a UE may not be a MSIM UE, i.e., the UE may have only one subscription, and the UE may also communicate with a radio network in a connected state, in an idle state, or in an inactive state. In some aspects, idle state of a UE (e.g., or a subscription of a MSIM UE) may refer to a power saving state of low network resource consumption and UE power usage where data is not exchanged, i.e., there is no connection between the radio access network (RAN) and the core network and the UE may not be transmitting or receiving data. Further, UE context may not be stored either at the UE or the RAN. In such cases, UE mobility may be based on cell reselection. That is, UE mobility may be autonomous within its tracking area and the core network may initiate paging to locate the UE (e.g., the UE may have to enter a connected state by establishing a radio resource control (RRC) connection with the RAN for data transmission).

In some aspects, connected state of a UE may refer to a UE state of high data exchange and power consumption where there is an active RRC connection between the UE and the RAN with established bearers. In such cases, UE context may be stored at both the UE and the RAN to facilitate communication therebetween and the RAN may initiate a connection to the core network to, among other things, relay data transmission to and from the UE. Further, UE mobility may be controlled by the network with the cell level location of the UE known by the RAN and UE handover procedures used to change serving cells.

In some aspects, a UE inactive state may refer to a low power consumption state configured for fast system access and efficient transmission of small data packets. In such a state, the RAN may be connected with the core network, and also may have an inactive RRC connection with the UE. Further, the UE context may be stored in the UE and the RAN to facilitate communication therebetween. In some cases, the core network may track the location of the UE within a tracking area list and the RAN may track the UE within a smaller so-called tracking RAN area. In some instances, UE mobility may be autonomous within the tracking RAN area to conserve power consumption.

In some aspects, a UE may be transitioned from one state to another state based on the level of data transmission activity between the UE and the radio network. For example, after a period with little or no data transmission between a UE in a connected state and a radio network, the network may initiate a state transition procedure to transition the UE from the connected state to an inactive state or idle state. In some instances, the determination whether to transition the UE to an inactive state or an idle state may depend at least in part on operational efficiency requirements of the radio network. For example, transitioning a UE from a connected state to an inactive state, as opposed to an idle state, may require additional memory space at the radio network because UE context may have to be stored at the network (i.e., at the RAN) when the UE is in an inactive state (e.g., in contrast to when the UE is in an idle state where UE context is not stored at the radio network). Such memory requirement may become cumbersome for the radio network when the radio network is loaded with the contexts of a large number of UEs, and the radio network may release a portion of the UE contexts based on priority to alleviate the memory burden. Further, a UE in an inactive state may trigger additional signaling compared to a UE in an idle state when the location of the UEs change, because in the former case the UE may have to report its location change to the radio network via RAN-based notification area (RNA) update to the radio network.

In some aspects, a UE may assist the radio network in determining whether to transition the UE to an inactive state or an idle state (e.g., when there is little or no data activity between the UE and the radio network) by transmitting a recommendation to the radio network based on the preferences of the UE. In some aspects, the request message may also include a reason for the request by the UE to be transitioned to an inactive state, an example of such a reason being poor signal coverage at the location of the UE. For instance, the UE may transmit a UEAssistanceInformation message configured to inform the radio network about the preferences of the UE with respect to transitioning to an idle state or an inactive state, and in some cases include the reasons for the transition request. For example, a UEAssistanceInformation message may have the following form:

```
UEAssistanceInformation{
    ReleasePreference-r16::=SEQUENCE {
        preferredRRC-State-r16    ENUMERATED    {idle,
            inactive, connected} OPTIONAL Cause {No-
            data, tuneaway, poorcoverage}
```

Some aspects of the present disclosure disclose different scenarios where a UE recommends to the radio network that the radio network transition the UE from a connected state or more to an inactive state or mode. In some aspects, an example scenario may include a MSIM UE where a first subscription of the MSIM UE is in a first connected state with a radio network and a second subscription of the MSIM UE may be in a second connected state. In such cases, the MSIM UE may recommend to the radio network whether to transition the first subscription or the second subscription to an inactive state based on the priority of the first connected state and/or the second connected state. Another example scenario may include a UE (e.g., an MSIM UE or otherwise (i.e., a UE with only a single subscription)) being in a connected state and recommending to the radio network whether to transition the UE to an inactive state based on the quality of the network signals at the location of the UE. And yet another example scenario may include a UE recommending to the radio network that the radio network transition the UE to an inactive state when there is a data stall (e.g., a data stall from the radio network due to the lack of scheduled downlink data transmission). FIGS. 4-7 are signaling diagrams illustrating the aforementioned scenarios of a UE transitioning to an inactive state, according to some aspects of the present disclosure.

Figure 4:
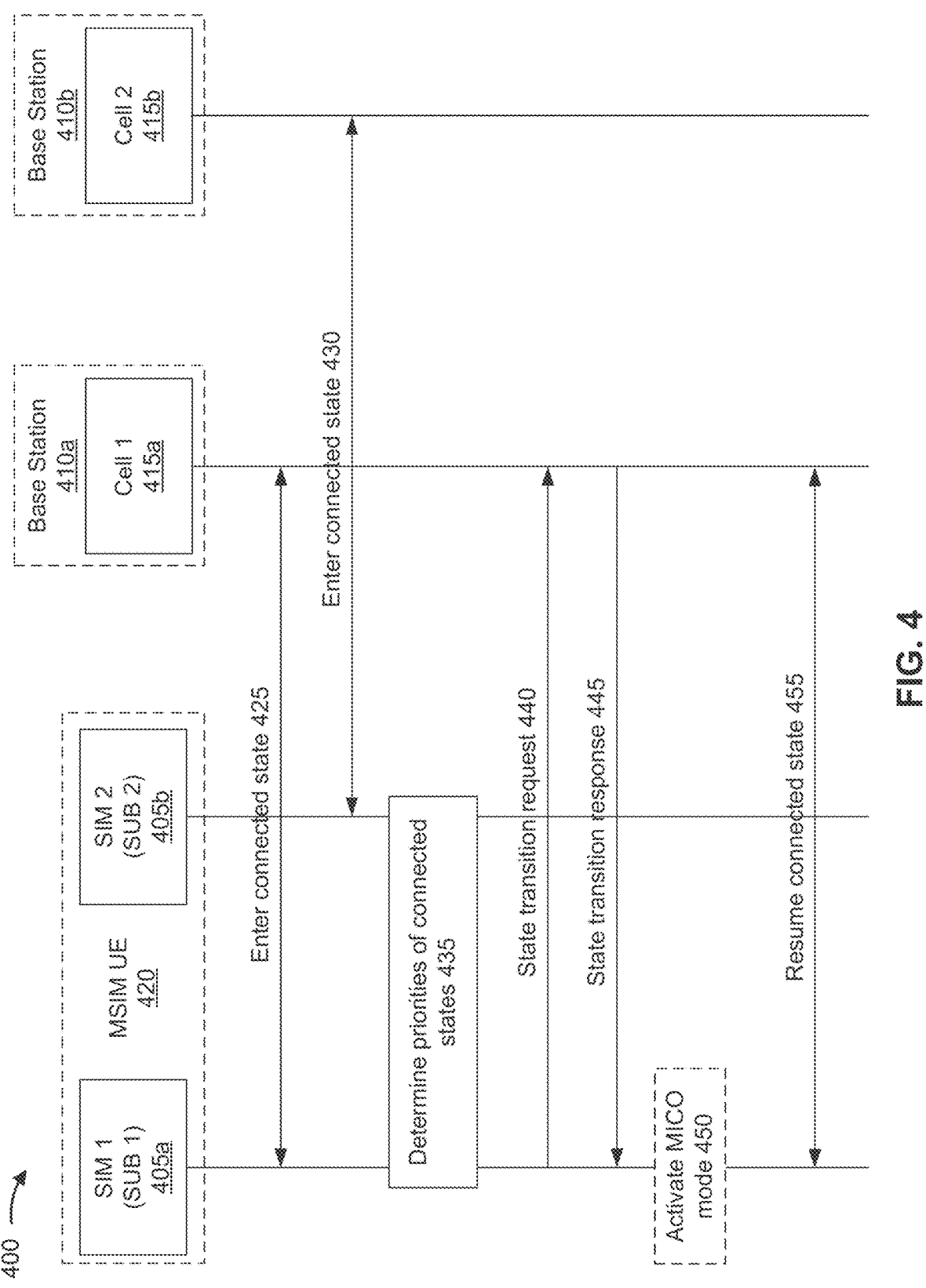
FIG. 4 is a signaling diagram illustrating an example transition of a subscription of a MSIM UE from a connected state to an inactive state, in accordance with various aspects of the present disclosure.

FIG. 4 is a signaling diagram illustrating an example transition of a subscription of a MSIM UE to an inactive state, in accordance with various aspects of the present disclosure. As shown in FIG. 4, the UE 420 may be a multi-SIM UE that includes multiple SIMs, shown as a first SIM 405a and a second SIM 405b (e.g., as described above in connection with FIG. 3). As also described above, the first SIM 405a may be associated with a first subscription (shown as SUB 1), and the second SIM 405b may be associated with a second subscription (shown as SUB 2). Although the description below may focus on multiple SIMs, the description applies equally to any other techniques for associating a plurality of subscriptions with the UE 420, such as embedded SIMs, virtual SIMs, other techniques for storing different IMSIs, and/or the like. Moreover, although the description below may focus on two subscriptions, the description similarly applies to other numbers of subscriptions for the UE 420. In addition, as illustrated, the method 400 includes a number of enumerated steps, but aspects of the method 400 may include additional steps before, after, and in between the enumerated steps. In some aspects, one or more of the enumerated steps may be omitted or performed in a different order.

As further shown in FIG. 4, the UE 420 may communicate with a first base station 410a via a first cell 415a (shown as Cell 1) using the first SIM 405a, and the UE 420 may communicate with a second base station 410b via a second cell 415b (shown as Cell 2) using the second SIM 405b (e.g., as described above in connection with FIG. 3). In method 400, the first base station 410a and the second base station 410b are shown as separate base stations; however, in some aspects, the first base station 410a and the second base station 410b may be integrated into a single base station (e.g., as described above in connection base station 110 of FIG. 1). In some aspects, the first cell 415a may be included in the first wireless network, and the second cell 415b may be included in the second wireless network.

At step 425, in some aspects, the first subscription SUB 1 405a of the MSIM UE 420 may enter into a connected state with the radio network, i.e., the SUB 1 405a may be in a connected state with the first base station 410a via Cell 1 415a. For example, SUB 1 405a may be making or receiving a voice call and may be in a connected state with the radio network via the base station 410a. As another example, SUB 1 405a may be in a connected mode/state with the radio network/base station 410a and may be exchanging data packets with the radio network/base station 410a. In some aspects, the connection between SUB 1 405a and the first base station 410a, i.e., the connected state of SUB 1 405a, may have associated therewith a first priority level.

At step 430, in some aspects, the second subscription SUB 2 405b of the MSIM UE 420 may enter into a connected state with the radio network, i.e., the SUB 2 405b may be in a connected state with the second base station 410b via Cell 2 415b. For example, SUB 2 405b may be making or receiving a voice call and may be in a connected state with the radio network via the base station 410b. As another example, SUB 2 405b may be in a connected mode/state with the radio network/base station 410b and may be exchanging data packets with the radio network/base station 410b. In some aspects, the connection between SUB 2 405b and the second base station 410b, i.e., the connected state of SUB 1 405b, may have associated therewith a second priority level.

At step 435, in some aspects, the MSIM UE 420 may determine the relative priorities of the connections between SUB 1 405a and base station 410a and between SUB 1 405b and base station 410b. For example, the MSIM UE 420 may determine which of the first priority level, of the first connected state between SUB 1 405a and base station 410a, or the second priority level, of the second connected state between SUB 1 405b and base station 410b, is higher. In some cases, the MSIM UE 420 may determine the relative priority levels of the connected states of the subscriptions SUB 1 405a and SUB 2 405b with respective radio networks via base stations 410a and 410b, respectively, so as to determine which subscription the MSIM UE 420 should recommend to the respective radio network for transition to inactive state.

In some aspects, a subscription of a MSIM UE being in a connected state with a radio network may result in one or more other subscriptions of the same MSIM UE exiting their respective connected state or mode. For example, SUB 1 405a of MSIM UE 420 may be in a connected state with base station 410a during a voice call. In such cases, SUB 2 405b may not be able to access or use the transceiver resource module (TRM) chain or radio frequency (RF) chain of the MSIM UE 420 which is occupied by SUB 1 405a, as a result of which SUB 2 405b may experience radio link failure (RLF) and determine that there is no service from the base station 410b (e.g., after SUB 2 405b is denied the RF chain for a pre-determined period such as but not limited to 10 s). Because SUB 2 405b loses its connection to the base station 410b due to RLF, in some cases, SUB 2 405b may have to re-register and re-establish the connection with the UE context at the base station 410b when the call at SUB 1 405a ends (e.g., in response to a paging message from the network/base station 410b). In some instances, such re-registration/re-establishment of connection with the entire UE context may be time and resource consuming and may increase system latency.

In some aspects, as noted above, a connected state of the second subscription SUB 2 405b with the second base station 410b may have a higher priority than a connected state of the first subscription SUB 1 405a with the first base station 410a. And in some aspects, the connected state of the second subscription SUB 2 405b with the second base station 410b may be configured to cause the first subscription SUB 1 405a with the first base station 410a to lose its connection (e.g., due to the first subscription SUB 1 405*a* experiencing RLF while in connected state when the second subscription SUB 2 405*b* is on a call and occupying the TRM chain). In such cases, the MSIM UE 420 (or first subscription SUB 1 405*a*, for instance) may communicate with its respective radio network or base station 410*a* to recommend to the base station 410*a* that the base station 410*a* transition the first subscription SUB 1 405*a* to an inactive state (and avoid experiencing RLF and losing connection/service, for example).

At step 440, in such cases, SUB 1 405*a* of MSIM UE 420 (i.e., the subscription with lower priority connected state, or the subscription that is in a connected state while the other subscription is on a call) may transmit a request to its respective radio network or base station 410*a* to transition SUB 1 405*a* to an inactive state. For example, SUB 2 405*b* may be on a call (e.g., and as such the TRM chain may not be available for SUB 1 405*a*), and SUB 1 405*a* may transmit a request to base station 410*a* to transition SUB 1 405*a* to an inactive state (e.g., to avoid SUB 1 405*a* experiencing RLF and losing connection/service).

In some aspects, the request may also include one or more reasons for the request by the SUB 1 405*a* to be transitioned from a connected state to an inactive state with base station 410*a*. For instance, the quality of signal coverage from base station 410*a* at the location of the MSIM UE 420 may be poor, and SUB 1 405*a* may attempt to avoid experiencing RLF and losing connection/service by requesting a transition from a connected state with base station 410*a* to an inactive state with base station 410*a*. In such cases, "poor coverage" may be included in the request as one of the one or more reasons for the SUB 1 405*a* for the transition request. In some aspects, another reason for the request can be the MSIM UE 420 tuning away from a radio network associated with one subscription (e.g., SUB 1 405*a*) of the MSIM UE 420 to another radio network that is associated with another subscription (e.g., SUB 2 405*b*) of the MSIM UE 420. In some cases, another reason for the transition request from a connected state to an inactive state can be an absence of downlink data transmission at the SUB 1 405*a* (e.g., the transition by SUB 1 405*a* to an inactive state may facilitate conserving UE resources such as battery power).

In some aspects, the request from SUB 1 405*a* to be transitioned from a connected state to an inactive state, with base station 410*a*, may be a UEAssistanceInformation message (e.g., including a reason or a cause for the request itself). For instance, the request can be a UEAssistanceInformation message having the following form:

UEAssistanceInformation{
        ReleasePreference-r16::=SEQUENCE {
            preferredRRC-State-r16 ENUMERATED {inactive}
                OPTIONAL Cause {tuneaway)

In some aspects, the request from SUB 1 405*a* to the radio network/base station 410*a* may also include an indication that SUB 1 405*a* may activate mobile initiated connection only (MICO) mode once the base station 410*a* transitions SUB 1 405*a* to an inactive state. In some instances, MICO mode may refer to a mode where SUB 1 405*a* is in deep sleep or low power mode where the radio network/base station 410*a* may not communicate with SUB 1 405*a* unless SUB 1 405*a* initiates the communication first. For instance, when SUB 1 405*a* is in MICO mode, the base station 410*a* may not page or contact SUB 1 405*a* otherwise, but instead may wait for SUB 1 405*a* to initiate connection with the base station 410*a* first. In some aspects, the indication that the SUB 1 405*a* may activate MICO mode after the base station 410*a* transitions SUB 1 405*a* to an inactive state may not be part of the inactive state transition request, but may be transmitted to the base station 410*a* in a separate message.

At step 445, in some aspects, base station 410*a* may transmit a response to SUB 1 405*a* in response to receiving the inactive state transition request to transition SUB 1 405*a* from a connected state with base station 410*a* to an inactive state with base station 410*a*. In some instances, the response may indicate that the base station 410*a*/radio network that SUB 1 405*a* is associated with may not transition SUB 1 405*a* from a connected state to an inactive state, with the radio network/the base station 410*a*. In such cases, SUB 1 405*a* may not be able to access or use the TRM chain of the MSIM 420 which is occupied by SUB 2 405*b*, as a result of which SUB 1 405*a* may experience RLF and determine that there is no service from the base station 410*a* (e.g., after SUB 1 405*a* is denied the RF chain for a pre-determined period such as but not limited to 10 s). In some instances, SUB 1 405*a* may lose its connection with base station 410*a* or the radio network with which SUB 1 405*a* is associated, and the radio network/base station 410*a* may transmit a RAN paging to resume connection with SUB 1 405*a*. In some instances, if the UE context is lost, the core network may page SUB 1 405*a* to resume the connection. In some aspects, the response may be a RRC release message containing a set of suspend configuration parameters such as but not limited to Inactive Radio Network Temporary Identity (I-RNTI).

In some aspects, the response from the base station 410*a* or the radio network that SUB 1 405*a* is associated with may indicate that the base station 410*a*/radio network has transitioned SUB 1 405*a* from a connected state with the radio network/the base station 410*a* to an inactive state with the radio network/the base station 410*a*. In some cases, if the request at step 450 included a reason for the request, the radio network/the base station 410*a* may understand the reason and behave accordingly. For example, if the reason provided in the request is that the other subscription of MSIM 420, SUB 2 405*b*, is on a call (e.g., and as such occupying the TRM chain), then the base station 410*a* may understand that a failure by SUB 1 405*a*, which has been transitioned by the base station 410*a* to an inactive state, to respond to a paging from the base station 410*a* may be because SUB 1 405*a* is unable to access the TRM chain and communicate (e.g., and not necessarily because of other issues). In such cases, for instance, the base station 410*a* may await for a communication from SUB 1 405*a* without paging SUB 1 405*a*. In some aspects, while SUB 1 405*a* is in inactive state, the base station 410*a* may intermittently or periodically page SUB 1 405*a* to re-establish connected state with SUB 1 405*a*.

At step 450, in some aspects, SUB 1 405*a* may activate MICO mode (e.g., if the request included an indication that SUB 1 405*a* intends to activate MICO mode once base station 410*a* transitioned SUB 1 405*a* from connected state to inactive state). In such cases, base station 410*a* may not page or contact SUB 1 405*a*, and may instead wait for SUB 1 405*a* to initiate the re-connection between SUB 1 405*a* and base station 410*a*. And because the UE context may still be stored both at the UE 420 and the RAN of base station 410*a* while SUB 1 405*a* is in inactive mode, in some aspects, SUB 1 405*a* may not be out-of-sync with base station 410*a*. In such instances, connected state between SUB 1 405*a* and base station 410*a* may be resumed, without executing the initial procedure for connecting a UE to a radio network or base station (e.g., without executing reacquisition, re-establishment, reconfiguration processes), upon SUB 1 405*a* initiating the re-connection process.

At step 455, in some aspects, SUB 1 405*a* may exit the inactive state and enter connected state with base station 410*a* after the call on SUB 2 405*b* is completed (e.g., and the TRM chain becomes available for SUB 1 405*a*). In some instances, for example if SUB 1 405*a* was not in MICO mode also in inactive state, SUB 1 405*a* may resume the connection to base station 410*a* (i.e., be in connected state with base station 410*a*) in response to receiving a paging message from base station 410*a* or the radio network with which SUB 1 405*a* is associated. In some instances, SUB 1 405*a* may be in MICO mode also in inactive state, and in such cases, SUB 1 405*a* may exit the inactive state and enter connected state with base station 410*a* after SUB 1 405*a* itself initiates the re-connection process with base station 410*a*.

In some aspects, an example application of method 400 may be illustrated with respect to a MSIM UE placed on airplane mode and having a first subscription SUB 1 and a second subscription SUB2, with the connected state of SUB 1 having priority over the connected state of SUB 2. In such an example, packet data network (PDN) connection may be deregistered first at SUB 1, followed by at SUB 2 if SUB 2 has not yet experienced RLF and lost its connected state. In some instances, SUB 2 may have experienced RLF and lost service and its connected state with the associated radio network (e.g., because SUB 2 have been denied access to the RF chain occupied by SUB 1). In such cases, PDN connection deregistration may fail at SUB 2 because the UE context has been removed from the radio network when SUB 2 lost its connected status (e.g., which in turn causes the failure of a scheduling request by the MSIM UE to re-establish connection or synchronization with the radio network). In such instances, a call to SUB 2 may trigger a notification informing the caller that the "user is not available" while an accurate notification should have read "device switched off." In some aspects, an application of method 400 to such MSIM UE may rectify such inaccuracy and improve user experience. For instance, the application of method 400 to such MSIM UE may result in SUB 2 being transitioned from its connected state with a radio network with which it is associated to an inactive state while the connected state of SUB 1 has higher priority over the connected state of SUB 2 (e.g., a call on SUB 1 has higher priority than the connection on SUB 2). In such a case, SUB 2 may be transitioned to an inactive state with the UE context maintained at the radio network. When airplane mode is enabled on the MSIM UE, in some instances, PDN connection deregistration on SUB 2 may successfully occur because re-connection or synchronization of SUB 2 with the radio network may be re-established when the higher priority call of SUB 1 is completed (e.g., because the UE context has not been removed from the radio network). As such, a call to SUB 2 may trigger a correct notification informing the caller that the "device switched off," improving user experience.

In some aspects, the request from SUB 1 405*a* to base station 410*a* (e.g., the UEAssistanceInformation message) may be transmitted by the SUB 1 405*a* with a significant amount of power (e.g., maximum transmission power of the SUB 1 405*a*) to increase the probability that the base station 410*a* receives the request. Further, the response from the base station 410*a* to the SUB 1 405*a* (e.g., the RRC release with suspend configuration parameters) may be transmitted by the base station 410*a* multiple number of times (e.g., 2, 3, 4, 5, 6, 7, 8, etc.) to improve the probabilities that SUB 1 405*a* receives the response reliably.

As indicated above, FIG. 4 is provided as an example. Other examples may differ from what is described with respect to FIG. 4.

Figure 5:
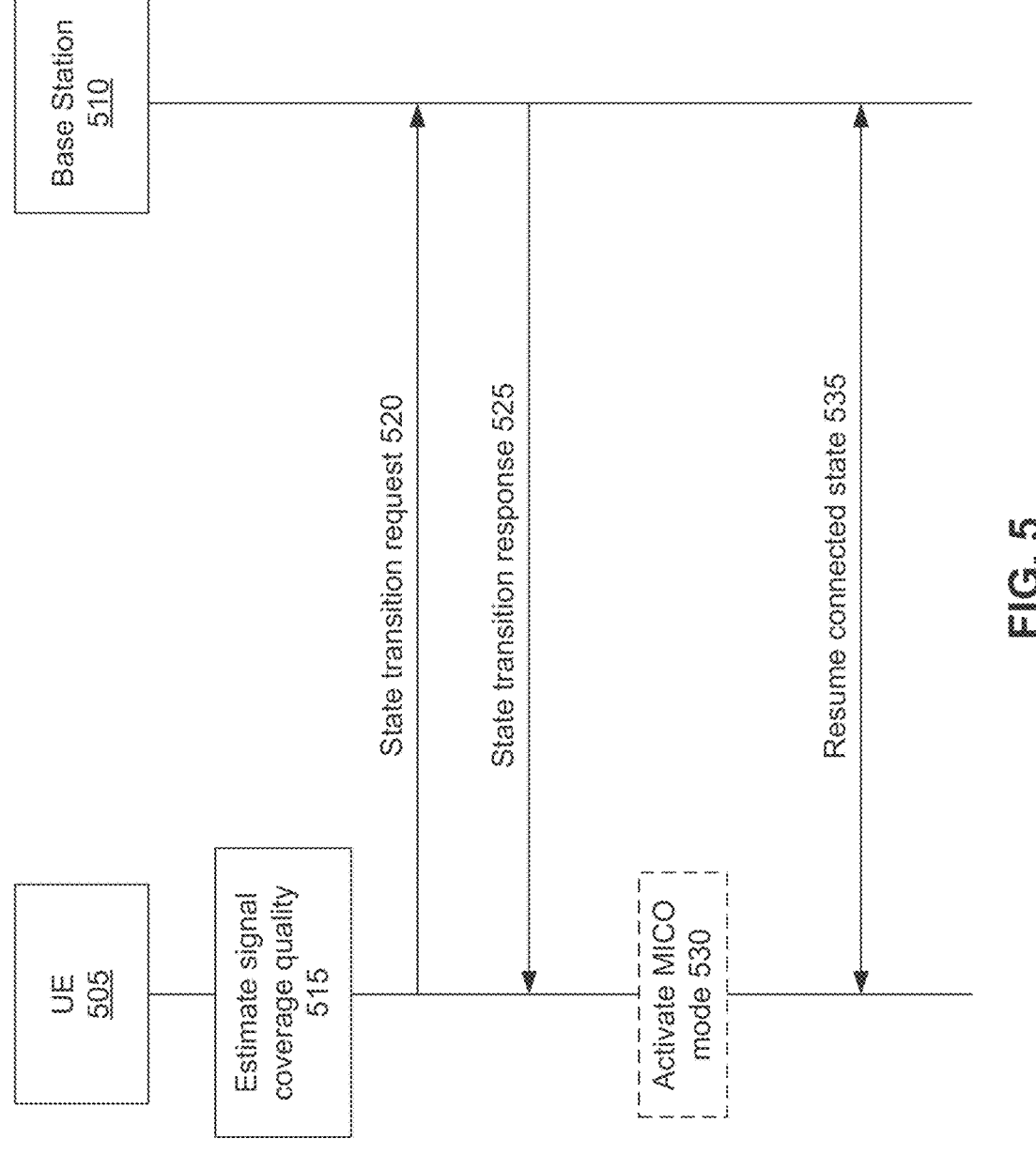
FIG. 5 is a signaling diagram illustrating an example transition of a UE from a connected state to an inactive state based on network signal coverage quality at the location of the UE, in accordance with various aspects of the present disclosure.

FIG. 5 is a signaling diagram illustrating an example transition of a UE to an inactive state based on network signal coverage quality at the location of the UE, in accordance with various aspects of the present disclosure. The method 500 may be implemented by a UE 505, such as UEs 120, and base station (BS) 510, such as BS 110. Steps of the method 500 can be executed by computing devices (e.g., a processor, processing circuit, and/or other suitable component) of the BS and the UE. For example, UE 505 may utilize one or more components, such as the processor 702, the memory 704, the IST module 708, the transceiver 710, the modem 712, and/or the one or more antennas 716, to execute the steps of method 500. As illustrated, the method 500 includes a number of enumerated actions, but aspects of the method 500 may include additional actions before, after, and in between the enumerated actions. In some aspects, one or more of the enumerated actions may be omitted or performed in a different order.

At step 515, in some aspects, a UE 505 may be in a connected state with BS 510 and may estimate the quality of the signal from the BS 510 at the location of the UE 505. In some aspects, the UE 505 may determine its location using a location-based communication module of the UE 505, and estimate the signal quality at that determined location (e.g., based on a previous known association between the determined location and the signal quality at that location). For example, if a certain location is known to have poor signal quality from BS 510 and UE 505 determines that it has entered the location based on measurements from a location-based communication module of UE 505, UE 505 may estimate the signal quality at that location. Examples of location-based communication modules of UE 505 may include a global positioning system (GPS) module, a Wi-Fi® module, etc.

For instance, a UE 505 may determine that the UE 505 is entering a location which may in general be deemed to have a known signal quality (e.g., the UE 505 is entering an elevator which in general is deemed to have poor signal quality based on based on previous measurements or based on known association between the location of the elevator and signal quality at that location). In such cases, the UE 505 may estimate the signal quality at that determined location based on the known signal quality of the location.

In some aspects, the UE 505, which may be in a connected state with BS 510, may estimate the quality of the signal from the BS 510 at the location of the UE 505 based on a block error rate (BLER) measurement of a communication of the UE 505 with BS 510 during the connected state. For example, the UE 505 may measure a BLER that exceeds a threshold amount (e.g., the UE 505 may be increasing a transmission power of the communication of the UE 505 with the BS 510 to compensate for the BLER). In such cases, the UE 505 may estimate the quality of the signal from the BS 510 at the location of the UE 505 based on the measured BLER and/or the increase in the transmission power by the UE 505 to compensate for the BLER. For instance, the UE 505 may estimate that the signal quality at the location of the UE 505 is poor if the measured BLER or the increase in the transmission power is above a respective threshold amount.

In some aspects, the UE 505 may estimate the quality of the signal from the BS 510 at the location of the UE 505 based on the mobility of the UE 505. In some instances, the UE 505 may detect the mobility of the UE 505 using a motion detector and estimate the signal quality based on the detected mobility. In some instances, the UE 505 may estimate the quality of the signal based on the speed of its mobility. For example, the UE 505 may be traveling at a high speed and may experience poor signal coverage due to its mobility, and may estimate the signal quality (e.g., of the poor coverage) based on the speed of the mobility (e.g., the higher the speed of the mobility the worse the estimated quality of the signal from the BS 150).

At step 520, in some aspects, the UE 505 may transmit a request (e.g., inactive state transition request) to BS 510 for the BS 510 to transition the UE 505 from a connected state with BS 150 to an inactive state with the BS 150. For example, as discussed above, the UE 505 may have estimated the quality of the signal from the BS 510 at the location of the UE 505 as discussed above and determined that the signal quality is below a threshold for the UE 505 to request to be transitioned from a connected state to an inactive state. In some aspects, the UE 505 may request to be transitioned to an inactive state with the BS 510 to avoid having to experience RLF and enter idle state because of the low quality of the signals from the BS 510 at the location of the UE 505. In some cases, a UE 505 that experiences RLF for the duration of a T311 time (e.g., time for the UE 505 to re-establish RRC connection after experiencing RLF) may enter idle state with BS 510. While the UE 505 is in the idle state, in some aspects, the UE context may be removed from or may not be stored at BS 510, which may result in the UE context having to be re-registered and re-established at the BS 510 again for the UE 505 to be connected anew with the BS 510, a process that may be time and resource consuming and may increase system latency. As such, to avoid such inefficiencies, in some aspects, the UE 505 may transmit a request to the BS 510 to transition the UE 505 from a connected state with the BS 510 to an inactive state with the BS 510 when the UE 505 estimates or determines a poor signal quality or poor coverage at the location of the UE 505.

In some aspects, the request may include the reason for the request by the UE to be transitioned to an inactive state, i.e., the poor signal quality or poor coverage from BS 510. In some aspects, the request may be a UEAssistanceInformation message and may read as:

UEAssistanceInformation{
        ReleasePreference-r16:: =SEQUENCE {
            preferredRRC-State-r16 ENUMERATED {inactive}
                OPTIONAL Cause {poor coverage}

In some aspects, the request from UE 505 to BS 510 may also include an indication that UE 505 may activate MICO mode once the BS 510 transitions UE 505 from the connected state to an inactive state. In some instances, MICO mode may refer to a mode where UE 505 is in deep sleep or low power mode and BS 510 may not wake UE 505 from the deep sleep, i.e., BS 510 may not communicate with UE 505 unless UE 505 initiates the communication first. For instance, when UE 505 is in MICO mode, the BS 510 may not page or contact UE 505 otherwise, but instead may wait for UE 505 to initiate re-connection with the BS 510 first. In some aspects, the indication that the UE 505 may activate MICO mode after the BS 510 transitions UE 505 to an inactive state may not be part of the inactive state transition request, but may be transmitted to the BS 510 in a separate message.

At step 525, in some aspects, BS 510 may transmit a response to UE 505 in response to receiving the inactive state transition request to transition UE 505 from a connected state with BS 510 to an inactive state with BS 510. In some instances, the response may indicate that the BS 510 has transitioned UE 505 from a connected state with the BS

510 to an inactive state with the BS 510. In some cases, if the request at step 520 included the reason (i.e., poor coverage or low signal quality) for the request, the BS 510 may understand the reason and behave accordingly, such as awaiting for UE 505 to re-establish connection with BS 510 (e.g., when signal quality improves to some threshold value for the UE 505 to re-establish connection with the BS 510) without the BS 510 paging UE 505. In some aspects, while UE 505 is in inactive state, the BS 510 may intermittently or periodically page UE 505 to re-establish connected state with BS 510. In some aspects, the response may be a RRC release message containing a set of suspend configuration parameters such as but not limited to Inactive Radio Network Temporary Identity (I-RNTI).

At step 530, in some aspects, UE 505 may activate MICO mode (e.g., if the request included an indication that UE 505 intends to activate MICO mode once BS 510 transitioned UE 505 from a connected state to an inactive state with BS 510). In such cases, BS 510 may not page or contact UE 505, and instead may wait for UE 505 to initiate the re-connection between UE 505 and BS 510. And because the UE context may still be stored both at the UE 505 and the BS 510 while UE 505 is in inactive state or mode, in some aspects, UE 505 may not be out-of-sync with BS 510. In such instances, connected state between UE 505 and BS 510 may be resumed, without executing the initial procedure for connecting a UE to a radio network or base station (e.g., without executing reacquisition, re-establishment, reconfiguration processes), upon UE 505 initiating the re-connection process.

At step 535, in some aspects, UE 505 may exit the inactive state and enter connected state with BS 510 after the UE 505 estimates or determines that the signal quality has improved to above a signal quality threshold for resuming connected status with BS 510. For instance, such a signal quality threshold may correspond to a signal strength where the UE 505 may not experience RLF or may be able to re-establish connection within T311 time if the UE 505 experienced RLF. In some instances, for example if UE 505 was not in MICO mode while also in inactive state, UE 505 may resume the connection to BS 510 (i.e., be in connected state with BS 510) in response to receiving a paging message from BS 510. In some instances, UE 505 may be in MICO mode while still in inactive state, and in such cases, UE 505 may exit the inactive state and enter connected state with BS 510 after UE 505 itself initiates the re-connection process with UE 505 (e.g., without receiving a paging message from BS 510).

In some aspects, the request from UE 505 to BS 510 (e.g., the UEAssistanceInformation message) may be transmitted by the UE 505 with a significant amount of power (e.g., maximum transmission power of the UE 505) to increase the probability that the BS 510 receives the request. Further, the response from the BS 510 to the UE 505 (e.g., the RRC release with suspend configuration parameters) may be transmitted by the BS 510 multiple number of times (e.g., 2, 3, 4, 5, 6, 7, 8, etc.) to improve the probabilities that UE 505 receives the response reliably.

As indicated above, FIG. 5 is provided as an example. Other examples may differ from what is described with respect to FIG. 5.

Figure 6:
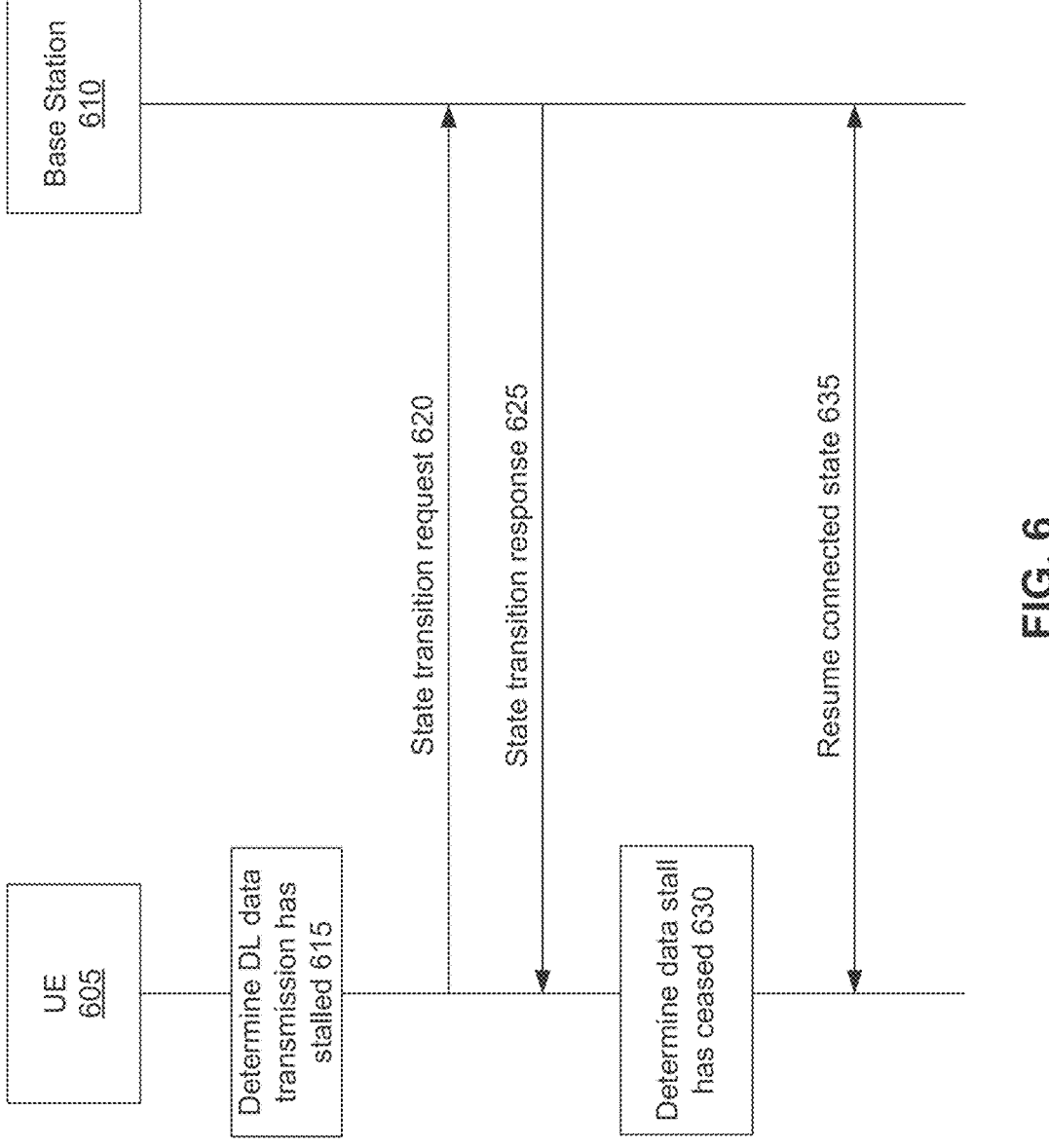
FIG. 6 is a signaling diagram illustrating an example transition of a UE from a connected state to an inactive state due to downlink data stall, in accordance with various aspects of the present disclosure.

FIG. 6 is a signaling diagram illustrating an example transition of a UE from a connected state to an inactive state due to a downlink data stall, in accordance with various aspects of the present disclosure. The method 600 may be implemented by a UE 605, such as UEs 120, and BS 610, such as BS 110. Steps of the method 600 can be executed by computing devices (e.g., a processor, processing circuit, and/or other suitable component) of the BS and the UE. For example, UE 605 may utilize one or more components, such as the processor 702, the memory 704, the IST module 708, the transceiver 710, the modem 712, and/or the one or more antennas 716, to execute the steps of method 600. As illustrated, the method 600 includes a number of enumerated actions, but aspects of the method 600 may include additional actions before, after, and in between the enumerated actions. In some aspects, one or more of the enumerated actions may be omitted or performed in a different order.

At step 615, in some aspects, a UE 605 may be in a connected state with BS 610 and may determine that data transmission from the BS 610 to the UE 505 has stalled, for example, because BS 610 has not scheduled downlink data transmission. In some aspects, the UE 605 may determine that data stall has occurred because the UE 605 may detect that little or no data has been received at the UE 605 from the BS 610. In some instances, the UE 605 may determine that data stall has occurred when less than a threshold amount of data (e.g., no data) has been received from the BS 610 during a pre-determined time period. In some instances, the UE 605 may determine that data stall has occurred when, as noted above, the BS 610 has not scheduled downlink data.

At step 620, in some aspects, in response to detecting or determining that data stall from the BS 610 to the UE 605 has occurred, the UE 605, which may be in a connected state with the BS 610, may transmit a request (e.g., inactive state transition request) to BS 610 for the BS 610 to transition the UE 605 from the connected state with the BS 610 to an inactive state with the BS 610. For example, as discussed above, a pre-determined duration may have passed since the UE 605 has received any downlink transmission, or downlink transmission exceeding a threshold amount, from the BS 610 and the UE 605 may in response transmit the request to the BS 610 for the BS 610 to transition the UE 605 to an inactive state from its connected state with the BS 610. In some cases, the threshold amount may be the minimum amount of data the UE 605 may receive below which the UE 605 may make the determination that data stall has occurred. In some aspects, the request may be a UEAssistanceInformation message and may read as:

UEAssistanceInformation{
    ReleasePreference-r16::=SEQUENCE {
        preferredRRC-State-r16 ENUMERATED {inactive}
            OPTIONAL At step 625, in some aspects, BS 610 may transmit a response to UE 605 in response to receiving from the UE 605 the inactive state transition request. In some instances, the response may indicate that the BS 610 has transitioned UE 605 from a connected state with the BS 610 to an inactive state with the BS 610. In some aspects, the response may be a RRC release message containing a set of suspend configuration parameters such as but not limited to Inactive Radio Network Temporary Identity (I-RNTI).

At step 630, in some aspects, UE 605 may determine that data stall from the BS 610 to the UE 605 has ceased (e.g., downlink data transmission from the BS 610 to the UE 605 has re-started or the amount of data transmission from the BS 610 to the UE 605 has exceeded the above-noted threshold amount for the UE 605 to make the determination that data stall has ceased).

At step 635, in some aspects, UE 605 may exit the inactive state and enter connected state with BS 610 in response to the determination that data stall from the BS 610 to the UE 605 has ceased.

In some aspects, the request from the UE 605 to the BS 610 (e.g., the UEAssistanceInformation message) may be transmitted by the UE 605 with a significant amount of power (e.g., maximum transmission power of the UE 605) to increase the probability that the BS 610 receives the request. Further, the response from the BS 610 to the UE 605 (e.g., the RRC release with suspend configuration parameters) may be transmitted by the BS 610 multiple number of times (e.g., 2, 3, 4, 5, 6, 7, 8, etc.) to improve the probabilities that UE 605 receives the response reliably.

As indicated above, FIG. 6 is provided as an example. Other examples may differ from what is described with respect to FIG. 6.

Figure 7:
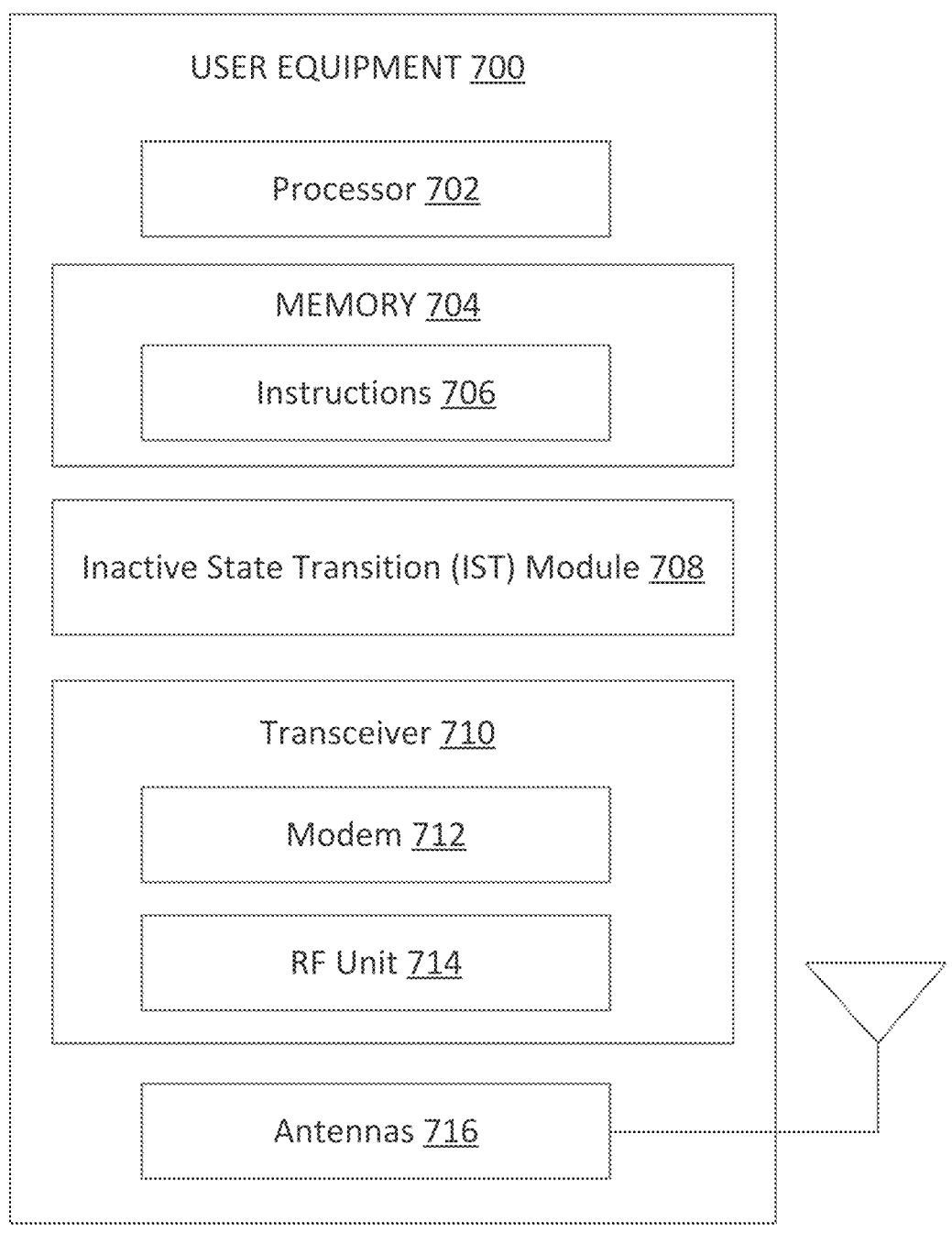
FIG. 7 is a block diagram of an exemplary user equipment (UE), according to some aspects of the present disclosure.

FIG. 7 is a block diagram of an exemplary UE 700 according to some aspects of the present disclosure. The UE 700 may be a UE 120 as discussed above with respect to FIG. 1. As shown, the UE 700 may include a processor 702, a memory 704, a multi-SIM inactive state (MIS) module 708, a transceiver 710 including a modem subsystem 712 and a radio frequency (RF) unit 714, and one or more antennas 716. These elements may be in direct or indirect communication with each other, for example via one or more buses.

The processor 702 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 704 includes a non-transitory computer-readable medium. The memory 704 may store, or have recorded thereon, instructions 706. The instructions 706 may include instructions that, when executed by the processor 702, cause the processor 702 to perform the operations described herein with reference to the UEs 120 in connection with aspects of the present disclosure, for example, aspects of FIGS. 1-6 and 9-11. Instructions 706 may also be referred to as program code. The program code may be for causing a wireless communication device to perform these operations, for example by causing one or more processors (such as processor 702) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The IST module 708 may be implemented via hardware, software, or combinations thereof. For example, the IST module 708 may be implemented as a processor, circuit, and/or instructions 706 stored in the memory 704 and executed by the processor 702. In some examples, the IST module 708 can be integrated within the modem subsystem 712. For example, the IST module 708 can be implemented by a combination of software components (e.g., executed by a DSP or a general processor) and hardware components (e.g., logic gates and circuitry) within the modem subsystem 712.

The IST module 708 may be used for various aspects of the present disclosure, for example, aspects of FIGS. 1-6 and 9-11. In some aspects, the IST module 708 may be configured to determine a first subscription of the MSIM UE is in a first connected state with a first network and a second subscription of the MSIM UE is in a second connected state with a second network. Further, the IST module 708 may be configured to transmit, to the network, a request configured to request a transition of the first subscription from the connected state to an inactive state with the first network when a connection of the second connected state has a higher priority than a connection of the first connected state.

In some aspects, the IST module 708 may be configured to perform a first estimation of a quality of signal coverage of a network at a location of the UE that is in a connected state with the network. Further, the IST module 708 may be configured to determine whether to transmit a request to the network based on the first estimation, the request configured to request a transition of the UE from the connected state to an inactive state with the network.

In some aspects, the IST module 708 may be configured to determine downlink data transmission to the UE from a network to which the UE is in a connected state has stalled. Further, the IST module 708 may be configured to transmit, to the network, a request configured to request a transition of the UE from the connected state to an inactive state with the network.

As shown, the transceiver 710 may include the modem subsystem 712 and the RF unit 714. The transceiver 710 can be configured to communicate bi-directionally with other devices, such as the BSs 110 and/or the UEs 120. The modem subsystem 712 may be configured to modulate and/or encode the data from the memory 704 and/or the IST module 708 according to a modulation and coding scheme (MCS), e.g., a low-density parity check (LDPC) coding scheme, a turbo coding scheme, a convolutional coding scheme, a digital beamforming scheme, etc. The RF unit 714 may be configured to process (e.g., perform analog to digital conversion or digital to analog conversion, etc.) modulated/encoded data (e.g., PSCCH, PSSCH, PSFCH, measurement data, UE assistance information, and/or sensor data records) from the modem subsystem 712 (on outbound transmissions) or of transmissions originating from another source such as a UE 120 or a BS 110. The RF unit 714 may be further configured to perform analog beamforming in conjunction with the digital beamforming. Although shown as integrated together in transceiver 710, the modem subsystem 712 and the RF unit 714 may be separate devices that are coupled together at the UE 120 to enable the UE to communicate with other devices.

The RF unit 714 may provide the modulated and/or processed data, e.g. data packets (or, more generally, data messages that may include one or more data packets and other information), to the antennas 716 for transmission to one or more other devices. The antennas 716 may further receive data messages transmitted from other devices. The antennas 716 may provide the received data messages for processing and/or demodulation at the transceiver 710. The transceiver 710 may provide the demodulated and decoded data (e.g., PSBCH, sidelink RMSI, PSSCH, PSCCH, PSFCH, RRC messages, UE assistance information, control commands, etc.) to the IST module 708 for processing. The antennas 716 may include multiple antennas of similar or different designs in order to sustain multiple transmission links. The RF unit 714 may configure the antennas 716.

In an aspect, the UE 700 can include multiple transceivers 710 implementing different RATs (e.g., NR and LTE). In an aspect, the UE 700 can include a single transceiver 710 implementing multiple RATs (e.g., NR and LTE). In an aspect, the transceiver 710 can include various components, where different combinations of components can implement different RATs.

Figure 8:
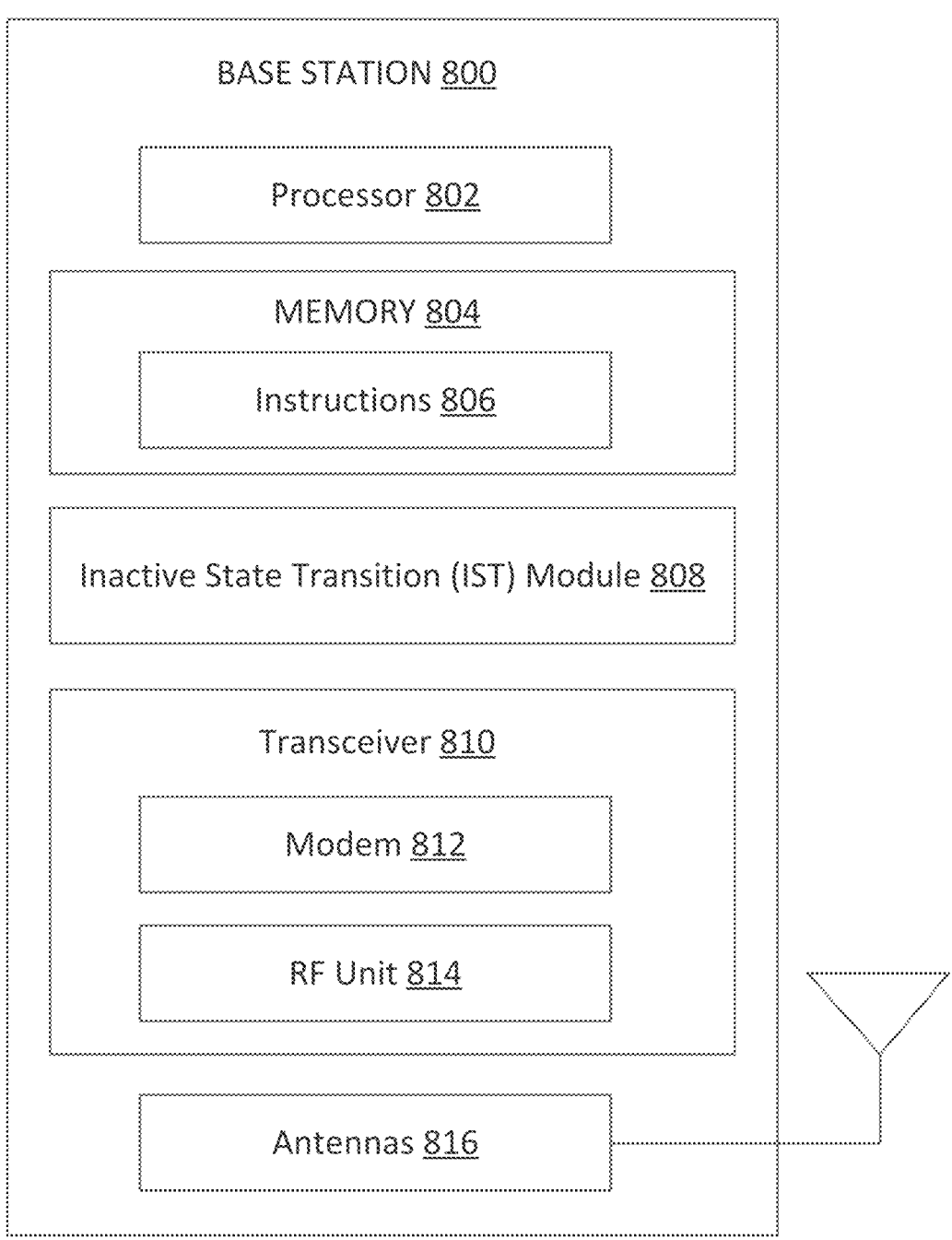
FIG. 8 is a block diagram of an exemplary base station (BS), according to some aspects of the present disclosure.

FIG. 8 is a block diagram of an example BS 800 according to some aspects of the present disclosure. The BS 800 may be a BS 110 in the network 100 as discussed above in FIG. 1. As shown, the BS 800 may include a processor 802, a memory 804, a IST module 808, a transceiver 810 including a modem subsystem 812 and a RF unit 814, and one or more antennas 816. These elements may be in direct or indirect communication with each other, for example via one or more buses.

The processor 802 may have various features as a specific-type processor. For example, these may include a CPU, a DSP, an ASIC, a controller, a FPGA device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 804 may include a non-transitory computer-readable medium. The memory 804 may store instructions 806. The instructions 806 may include instructions that, when executed by the processor 802, cause the processor 802 to perform operations described herein, for example, aspects of FIGS. 1-6 and 9-11. Instructions 806 may also be referred to as program code. The program code may be for causing a wireless communication device to perform these operations, for example by causing one or more processors (such as processor 802) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The IST module 808 may be implemented via hardware, software, or combinations thereof. For example, the IST module 808 may be implemented as a processor, circuit, and/or instructions 806 stored in the memory 804 and executed by the processor 802. In some examples, the IST module 808 can be integrated within the modem subsystem 812. For example, the IST module 808 can be implemented by a combination of software components (e.g., executed by a DSP or a general processor) and hardware components (e.g., logic gates and circuitry) within the modem subsystem 812.

As shown, the transceiver 810 may include the modem subsystem 812 and the RF unit 814. The transceiver 810 can be configured to communicate bi-directionally with other devices, such as the UEs 120, and/or another core network element. The modem subsystem 812 may be configured to modulate and/or encode data according to a modulation and coding scheme (MCS), e.g., a low-density parity check (LDPC) coding scheme, a turbo coding scheme, a convolutional coding scheme, a digital beamforming scheme, etc. The RF unit 814 may be configured to process (e.g., perform analog to digital conversion or digital to analog conversion, etc.) modulated/encoded data (e.g., PSBCH, sidelink RMSI, PSSCH, PSCCH, PSFCH, RRC configuration, UE assistance information, control commands, etc.) from the modem subsystem 812 (on outbound transmissions) or of transmissions originating from another source such as a UE 120. The RF unit 814 may be further configured to perform analog beamforming in conjunction with the digital beamforming. Although shown as integrated together in transceiver 810, the modem subsystem 812 and/or the RF unit 814 may be separate devices that are coupled together at a UE 120 to enable the UEs to communicate with other devices.

The RF unit 814 may provide the modulated and/or processed data, e.g. data packets (or, more generally, data messages that may contain one or more data packets and other information), to the antennas 816 for transmission to one or more other devices. This may include, for example, transmission of information to complete attachment to a network and communication with a camped UE 120 according to some aspects of the present disclosure. The antennas 816 may further receive data messages transmitted from other devices and provide the received data messages for processing and/or demodulation at the transceiver 810. The transceiver 810 may provide the demodulated and decoded data (e.g., PSCCH, PSSCH, PSFCH, measurement data, and/or sensor data records) to the IST module 808 for processing. The antennas 816 may include multiple antennas of similar or different designs in order to sustain multiple transmission links.

In an aspect, the BS 800 can include multiple transceivers 810 implementing different RATs (e.g., NR and LTE). In an aspect, the BS 800 can include a single transceiver 810 implementing multiple RATs (e.g., NR and LTE). In an aspect, the transceiver 810 can include various components, where different combinations of components can implement different RATs.

FIG. 9 is a flow diagram illustrating a method according to some aspects of the present disclosure. Aspects of the method 900 can be executed by a computing device (e.g., a processor, processing circuit, and/or other suitable component) of a wireless communication device or other suitable means for performing the steps. For example, a wireless communication device, such as a UE 120, may utilize one or more components, such as the processor 702, the memory 704, the IST module 708, the transceiver 710, the modem 712, and/or the one or more antennas 716, to execute the steps of method 900. The method 900 may employ similar mechanisms as described above in FIGS. 1-6. As illustrated, the method 900 includes a number of enumerated steps, but aspects of the method 900 may include additional steps before, after, and in between the enumerated steps. In some aspects, one or more of the enumerated steps may be omitted or performed in a different order.

At block 910, a UE may determine a first subscription of the MSIM UE is in a first connected state with a first network and a second subscription of the MSIM UE is in a second connected state with a second network.

At block 920, the UE may transmit, to the network, a request configured to request a transition of the first subscription from the connected state to an inactive state with the first network when a connection of the second connected state has a higher priority than a connection of the first connected state.

In some aspects, the request may include a mobile initiated connection only (MICO) information element indicating to the first network that the MSIM UE is entering MICO mode when the first subscription is transitioned to the inactive state. In some aspects, the request may include an information element indicating a reason for requesting the transition from the connected state to the inactive state. In some aspects, the request may include an information element indicating a reason for requesting the transition from the connected state to the inactive state. In such cases, the method 900 may further include receiving a radio access network (RAN) paging message from the first network configured to trigger the first subscription to resume the first connected state, the RAN paging message generated based on the information element.

In some aspects, the reason for requesting the transition may include absence of incoming downlink data at the MSIM UE during the connected state, initiation by the MSIM UE of a tune away procedure to switch a radio access technology during the connected state, or a quality of signal coverage of the first network at a location of the MSIM UE being no greater than a threshold level of signal quality during the connected state. In some aspects, the first network and/or the second network include a long-term evolution (LTE) network or a new radio (NR) network. In some aspects, the request is a UE assistance information message. Some aspects of the method 900 may further include receiving from the first network, in response to transmitting the request, a radio resource control (RRC) release message configured to transition the first subscription of the UE from the connected state to the inactive state.

Figure 10:
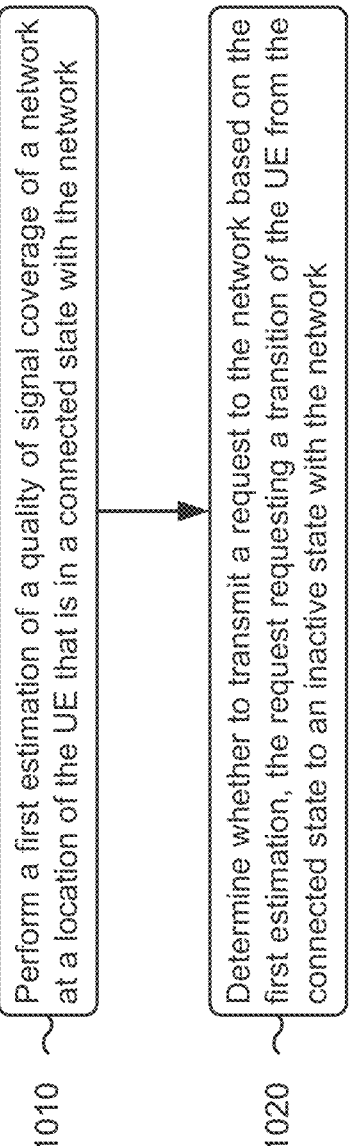
FIG. 10 is a flow diagram illustrating another method according to some aspects of the present disclosure.

FIG. 10 is a flow diagram illustrating a method according to some aspects of the present disclosure. Aspects of the method 1000 can be executed by a computing device (e.g., a processor, processing circuit, and/or other suitable component) of a wireless communication device or other suitable means for performing the steps. For example, a wireless communication device, such as a UE 120, may utilize one or more components, such as the processor 702, the memory 704, the IST module 708, the transceiver 710, the modem 712, and/or the one or more antennas 716, to execute the steps of method 1000. The method 1000 may employ similar mechanisms as described above in FIGS. 1-6. As illustrated, the method 1000 includes a number of enumerated steps, but aspects of the method 1000 may include additional steps before, after, and in between the enumerated steps. In some aspects, one or more of the enumerated steps may be omitted or performed in a different order.

At block 1010, a UE may perform a first estimation of a quality of signal coverage of a network at a location of the UE that is in a connected state with the network.

At block 1020, the UE may determine whether to transmit a request to the network based on the first estimation, the request configured to request a transition of the UE from the connected state to an inactive state with the network.

In some aspects, the first estimation indicates that the quality of signal coverage of the network is no greater than a threshold level of signal quality above which a radio link failure (RLF) is not triggered. In some aspects, the request may be transmitted to the network prior to the UE experiencing a RLF.

Some aspects of the method 1000 may include performing a second estimation of the quality of signal coverage of the network at the location of the UE after the UE is transitioned from the connected state to the inactive state by the network; and resuming the connected state when the second estimation indicates that the quality of signal coverage of the network is equal to or greater than a threshold level of signal quality above which a RLF is not triggered. Further, the method 1000 may include determining a type of an application executing on the UE and communicating with the network via the connected state of the UE with the network; and determining to transmit the request when the type of the application is a non-time critical application.

In some aspects, the first estimation can be performed using a location-based communication module of the UE. Further, the location-based communication module can include a global positioning system (GPS) module or a Wi-Fi® module. In some aspects, the first estimation is based on a mobility of the UE. In some aspects, the first estimation is based on a block error rate (BLER) measurement of a communication of the UE with the network during the connected state. In some aspects, the first estimation is based on a block error rate (BLER) measurement of a communication of the UE with the network during the connected state.

In some aspects, the network includes a long-term evolution (LTE) network or a new radio (NR) network. In some aspects, the request includes a mobile initiated connection only (MICO) information element indicating to the network that the UE is entering MICO mode when the UE is transitioned to the inactive state. Further, some aspects of the method 1000 include receiving from the network, in response to transmitting the request, a radio resource control (RRC) release message configured to transition the UE from the connected state to the inactive state.

Figure 11:
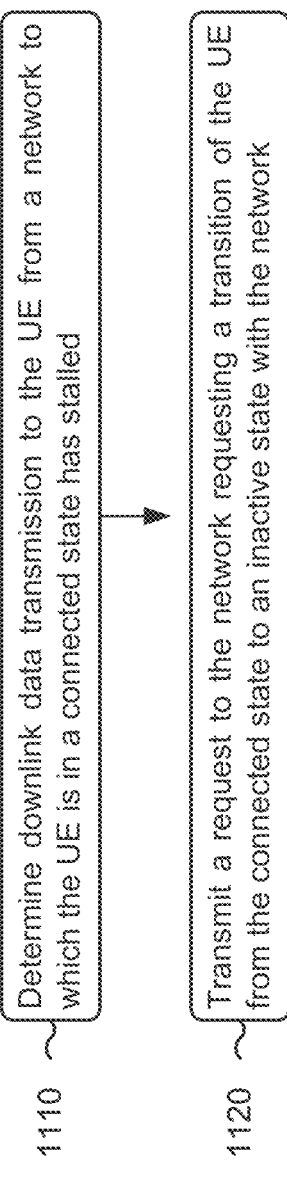
FIG. 11 is a flow diagram illustrating another method according to some aspects of the present disclosure.

FIG. 11 is a flow diagram illustrating a method according to some aspects of the present disclosure. Aspects of the method 1100 can be executed by a computing device (e.g., a processor, processing circuit, and/or other suitable component) of a wireless communication device or other suitable means for performing the steps. For example, a wireless communication device, such as a UE 120, may utilize one or more components, such as the processor 702, the memory 704, the IST module 708, the transceiver 710, the modem 712, and/or the one or more antennas 716, to execute the steps of method 1100. The method 1100 may employ similar mechanisms as described above in FIGS. 1-6. As illustrated, the method 1100 includes a number of enumerated steps, but aspects of the method 1100 may include additional steps before, after, and in between the enumerated steps. In some aspects, one or more of the enumerated steps may be omitted or performed in a different order.

At block 1110, a UE may determine downlink data transmission to the UE from a network to which the UE is in a connected state has stalled.

At block 1120, the UE may transmit, to the network, a request configured to request a transition of the UE from the connected state to an inactive state with the network.

In some aspects, the request is transmitted to the network with a maximum amount of power allocated for transmitting messages from the UE to the network. In some aspects, the request is a UE assistance information message. In some aspects, the network includes a long-term evolution (LTE) network or a new radio (NR) network. Some aspects of the method 1110 include receiving from the first network, in response to transmitting the request, a radio resource control (RRC) release message configured to transition the UE from the connected state to the inactive state.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:

performing a first estimation of a quality of signal coverage of a network at a location of the UE that is in a connected state with the network; and determining whether to transmit, prior to the UE experiencing a radio link failure (RLF), a request to the network based on the first estimation, the request configured to request a transition of the UE from the connected state to an inactive state with the network.

2. The method of claim 1, wherein the first estimation indicates that the quality of signal coverage of the network is in a range that triggers the RLF.

3. The method of claim 1, further comprising:

performing a second estimation of the quality of signal coverage of the network at the location of the UE after the UE is transitioned from the connected state to the inactive state by the network; and resuming the connected state when the second estimation indicates that the quality of signal coverage of the network improves so as not to trigger the RLF.

4. The method of claim 1, further comprising:

determining a type of an application executing on the UE and communicating with the network via the connected state of the UE with the network; and determining to transmit the request when the type of the application is a non-time critical application.

5. The method of claim 1, wherein the first estimation is performed using a location-based communication module of the UE.

6. The method of claim 5, wherein the location-based communication module includes a global positioning system (GPS) module or a Wi-Fi® module.

7. The method of claim 1, wherein the first estimation is based on a mobility of the UE.

8. The method of claim 1, wherein the first estimation is based on a block error rate (BLER) measurement of a communication of the UE with the network during the connected state.

9. The method of claim 1, wherein the network includes a long-term evolution (LTE) network or a new radio (NR) network.

10. The method of claim 1, wherein the request includes a mobile initiated connection only (MICO) information element indicating to the network that the UE is entering MICO mode when the UE is transitioned to the inactive state.

11. The method of claim 1, further comprising:

receiving from the network, in response to transmitting the request, a radio resource control (RRC) release message configured to transition the UE from the connected state to the inactive state.

12. A user equipment (UE), comprising:

a processor configured to:

perform a first estimation of a quality of signal coverage of a network at a location of the UE that is in a connected state with the network; and determine whether to transmit, prior to the UE experiencing a radio link failure (RLF), a request to the network based on the first estimation, the request configured to request a transition of the UE from the connected state to an inactive state with the network.

13. The UE of claim 12, wherein the first estimation indicates that the quality of signal coverage of the network is in a range that triggers the RLF.

14. The UE of claim 12, wherein the first estimation is performed using a location-based communication module of the UE.

15. The UE of claim 14, wherein the location-based communication module includes a global positioning system (GPS) module or a Wi-Fi® module.

16. The UE of claim 12, wherein the first estimation is based on a mobility of the UE.

17. The UE of claim 12, wherein the first estimation is based on a block error rate (BLER) measurement of a communication of the UE with the network during the connected state.

18. The UE of claim 12, wherein the request includes a mobile initiated connection only (MICO) information element indicating to the network that the UE is entering MICO mode when the UE is transitioned to the inactive state.

19. A method of wireless communication performed by a multi-subscriber identity module user equipment (multi-SIM UE), the method comprising:

establishing a first connection with a first base station associated with a first SIM of the multi-SIM UE; and determining whether to transmit, prior to the multi-SIM UE experiencing a radio link failure (RLF), a UE Assistance Information requesting a transition of the multi-SIM UE from a connected state to an inactive state; and transmitting the UE Assistance Information to the first base station, wherein the UE Assistance Information indicates the request is associated with a multi-SIM operation and the multi-SIM operation is associated with a second connection with a second base station associated with a second SIM of the multi-SIM UE.

20. The method of claim 19, wherein the second connection has a higher priority over the first connection.

21. The method of claim 19, wherein the second connection is established for a voice call.

22. The method of claim 19, wherein the multi-SIM UE includes a transceiver re-assigned from the first connection to the second connection.

23. The method of claim 22, where the transceiver comprises a transceiver implementing multiple radio access technologies (RATs).

24. The method of claim 23, wherein the multiple RATs include new-radio (NR) and long-term evolution (LTE).

25. The method of claim 19, wherein the first connection is a first new radio (NR) connection and the second connection is one of a second NR connection and a long-term evolution (LTE) connection.

26. A method of wireless communication performed by a multi-subscriber identity module user equipment (multi-SIM UE), the method comprising:

establishing a first connection with a first base station associated with a first SIM of the multi-SIM UE;

determining whether to transmit, prior to the multi-SIM UE experiencing a radio link failure (RLF), a UE Assistance Information requesting a transition of the multi-SIM UE from a connected state to an inactive state;

transmitting the UE Assistance Information to the first base station, wherein the UE Assistance Information indicates the request is associated with a multi-SIM operation and the multi-SIM operation is associated with a second connection with a second base station associated with a second SIM of the multi-SIM UE; and re-assigning a transceiver from the first connection and to the second connection.

27. The method of claim 26, wherein the first connection is a first new radio (NR) connection and the second connection is one of a second NR connection and a long-term evolution (LTE) connection.

28. The method of claim 26, wherein the transceiver comprises a transceiver implementing multiple radio access technologies (RATs).

29. The method of claim 26, wherein transmitting the UE Assistance Information is based at least in part on the second connection is for a voice call.

30. A multi-subscriber identity module user equipment (multi-SIM UE) for wireless communication, comprising:

one or more memories; and one or more processors, coupled to the one or more memories, configured to cause the multi-SIM UE to:

establish a first connection with a first base station associated with a first SIM of the multi-SIM UE;

determine whether to transmit, prior to the multi-SIM UE experiencing a radio link failure (RLF), a UE Assistance Information requesting a transition of the multi-SIM UE from a connected state to an inactive state; and transmit the UE Assistance Information to the first base station, wherein the UE Assistance Information indicates the request is associated with a multi-SIM operation and the multi-SIM operation is associated with a second connection with a second base station associated with a second SIM of the multi-SIM UE.

31. The multi-SIM UE of claim 30, wherein the second connection has a higher priority over the first connection.

32. The multi-SIM UE of claim 30, wherein the second connection is established for a voice call.

33. The multi-SIM UE of claim 30, wherein the multi-SIM UE includes a transceiver re-assigned from the first connection to the second connection.

34. The multi-SIM UE of claim 33, where the transceiver comprises a transceiver implementing multiple radio access technologies (RATs).

35. The multi-SIM UE of claim 34, wherein the multiple RATs include new radio (NR) and long-term evolution (LTE).

36. The multi-SIM UE of claim 30, wherein the first connection is a first new radio (NR) connection and the second connection is one of a second NR connection and a long- term evolution (LTE) connection.

37. A multi-subscriber identity module user equipment (multi-SIM UE) for wireless communication, comprising:

one or more memories; and one or more processors, coupled to the one or more memories, configured to cause the multi-SIM UE to:

establish a first connection with a first base station associated with a first SIM of the multi-SIM UE;

determine whether to transmit, prior to the multi-SIM UE experiencing a radio link failure (RLF), a UE Assistance Information requesting a transition of the multi-SIM UE from a connected state to an inactive state;

transmit the UE Assistance Information to the first base station, wherein the UE Assistance Information indicates the request is associated with a multi-SIM operation and the multi-SIM operation is associated with a second connection with a second base station associated with a second SIM of the multi-SIM UE; and re-assign a transceiver from the first connection and to the second connection.

38. The multi-SIM UE of claim 37, wherein the first connection is a first new radio (NR) connection and the second connection is one of a second NR connection and a long- term evolution (LTE) connection.

39. The multi-SIM UE of claim 37, wherein the transceiver comprises a transceiver implementing multiple radio access technologies (RATs).

40. The multi-SIM UE of claim 37, wherein transmitting the UE Assistance Information is based at least in part on the second connection is for a voice call.

* * * * *